United States Patent [19]
Salisbury et al.

[11] Patent Number: 6,084,887
[45] Date of Patent: Jul. 4, 2000

[54] SIGNALING PROTOCOL CONVERSION SYSTEM

[75] Inventors: Neil D. Salisbury, Dallas; Stephen L. Dulaney, Grand Prairie; Werner L. Heissenhuber, Carrollton; Michael H. Jette, Grapevine, all of Tex.

[73] Assignee: Alcatel USA Sourcing. L.P., Plano, Tex.

[21] Appl. No.: 08/926,631

[22] Filed: Sep. 10, 1997

Related U.S. Application Data

[60] Provisional application No. 60/048,040, May 30, 1997.

[51] Int. Cl.[7] .................................. H04J 3/16; H04J 3/12
[52] U.S. Cl. ............................................. 370/467; 370/522
[58] Field of Search ..................................... 370/466, 467, 370/464, 465, 522, 523, 524, 321, 322, 336, 337

[56] References Cited

U.S. PATENT DOCUMENTS

| | | | |
|---|---|---|---|
| 3,993,873 | 11/1976 | Bogda et al. .................... | 179/18 ES |
| 5,239,542 | 8/1993 | Breidenstein et al. ............ | 370/376 |
| 5,493,565 | 2/1996 | Hanson et al. .................... | 370/359 |
| 5,565,745 | 10/1996 | Huether et al. ................... | 375/377 |
| 5,640,386 | 6/1997 | Wiedeman ........................ | 370/320 |
| 5,751,717 | 5/1998 | Babu et al. ....................... | 370/466 |

*Primary Examiner*—Ajit Patel
*Assistant Examiner*—Brian Nguyen
*Attorney, Agent, or Firm*—Baker Botts L.L.P.

[57] ABSTRACT

A telecommunication system (10) includes one or more subscribers (24) that provide telecommunication traffic in an upstream direction to a D4 channel bank (26). The D4 channel bank provides network interface signals having a first signaling protocol format to a cross-connect (18) over a telecommunication link (28). The cross-connect (18) includes a signaling protocol converter (30) that converts network interface signals having the first signaling protocol format into network interface signals with a second signaling protocol format. The cross-connect (18) passes the network interface signals with the second signaling protocol format to a local digital switch (20) over any of multiple telecommunication links (22a–22n). In a downstream direction from the local digital switch (20) to the subscribers (24), the signaling protocol converter (30) converts from the second signaling protocol format to the first signaling protocol format. In this manner, devices with differing signal protocol formats may communication with each other.

5 Claims, 2 Drawing Sheets

SIGNALING PROTOCOL CONVERSION SYSTEM

CROSS REFERENCE TO RELATED APPLICATIONS

This application claims the benefit of U.S. Provisional Application No. 60/048,040 filed May 30, 1997.

TECHNICAL FIELD OF THE INVENTION

The present invention relates in general to telecommunications signal processing and more particularly to a signaling protocol conversion system.

BACKGROUND OF THE INVENTION

The new Telecommunications Act of 1996 has created a number of market applications for cross-connect systems. In order for telephone operating companies to gain access to new markets, they must be able to provide equal access to the loop otherwise known as unbundling. Opportunities exist for cost effective unbundling platforms. The large and expensive remote terminals of the past cannot meet the expectations required of the telecommunications industry under the age of the Telecommunications Act of 1996. Different hand-offs are needed between telephone operating companies and competitive local exchange carriers. Inexpensive and flexible cross-connect systems would be desirable in transferring the required hand-offs. However, conventional cross-connect systems are relatively passive beyond their cross-connect capabilities. Therefore, it is desirable to use cross-connect systems to provide appropriate hand-offs for numerous unbundling strategies.

SUMMARY OF THE INVENTION

From the foregoing, it may be appreciated that a need has arisen for a signaling conversion technique that can support a number of unique unbundling applications. In accordance with the present invention, a signaling protocol conversion system is provided that substantially eliminates or reduces disadvantages and problems associated with cross-connect telecommunications systems.

According to an embodiment of the present invention, there is provided a signaling protocol conversion system that includes a transceiver unit operable to receive an inbound network interface signal having a first signaling protocol. A protocol converter is operable to convert the first signaling protocol into a second signaling protocol. In this manner, for example, the signaling protocol conversion system can convert an inbound network interface signal with a TR-08 signaling protocol format into a network interface signal with a D4 signaling protocol format. A signaling protocol conversion system may also convert outbound network interface signals having the second signaling protocol format to outbound network interface signals having the first signaling protocol format.

The present invention provides various technical advantages over conventional cross-connect systems. For example, one technical advantage is the ability to convert from one signaling protocol format to a different signaling protocol format. Another technical advantage is to provide signaling protocol conversion selectable on a per channel basis. Yet another technical advantage is the ability to provide signaling protocol conversion independent of an offset to system timing of the network interface signal. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
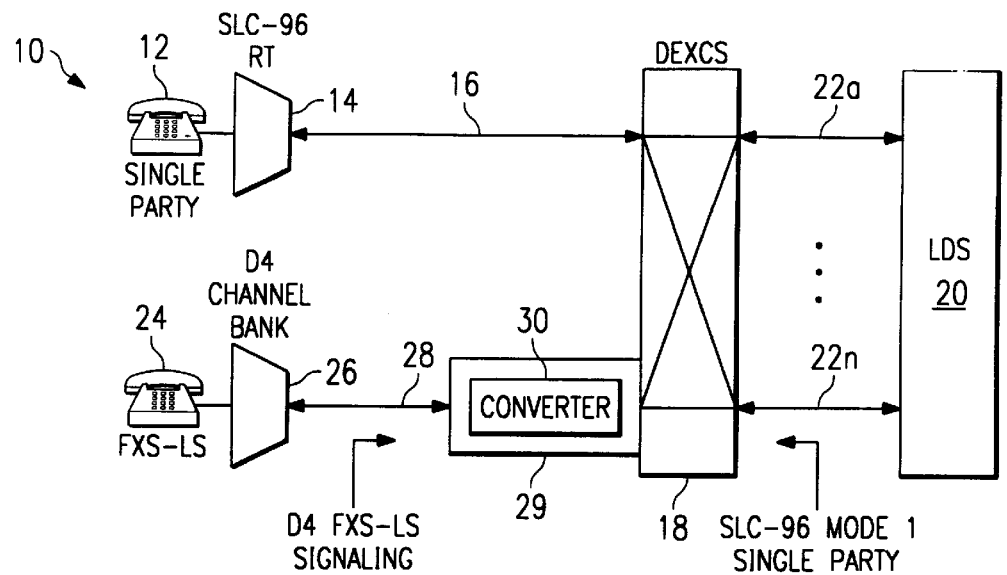
FIG. 1 illustrates a block diagram of a simplified telecommunication system.

FIG. 1 is a simplified block diagram of a telecommunication system 10. Operation of telecommunication system 10 will be described with reference to a specific example though other examples as discussed below may also be implemented. Telecommunication system 10 includes one or more first subscribers 12 that initiate or terminate telecommunication traffic through a remote terminal 14. In an upstream flow, telecommunication signals initiated by first subscriber 12 are processed by remote terminal 14 and transferred as network interface signals over a network link 16 to a cross-connect 18. Cross-connect 18 appropriately routes the network interface signals to a local digital switch 20 over any one of telecommunications links 22a–22n. In the downstream direction, local digital switch 20 transfers network interface signals to cross-connect 18 over any of telecommunications links 22a–22n. Cross-connect 18 appropriately connects the network interface signals destined for remote terminal 14 for transfer over telecommunications link 16. Remote terminal 14 processes the network interface signals to provide telecommunications traffic to first subscriber 12. In typical operation, cross-connect 18 provides only straight connections for the network interface signals wherein the individual network interface signals received from or transferred to telecommunication link 16 are the same as provided to or received from telecommunications links 22a–22n, respectively.

Telecommunication system 10 also includes one or more second subscribers 24 that provide telecommunications traffic to or receive telecommunications traffic from a D4 channel bank 26. In the upstream direction, D4 channel bank 26 provides network interface signals containing telecommunications traffic from second subscriber 24 to cross-connect 18 over a telecommunication link 28. Cross-connect 18 includes a line card 28 with a signaling protocol converter 30 that converts inbound network interface signals having a first signaling protocol format to network interface signals with a second signaling protocol format. The network interface signals with the second signaling protocol format are connected through cross-connect 18 to local digital switch 20 over appropriate telecommunications links, such as telecommunications links 22a and 22b, as determined by cross-connect 18. In the downstream direction, local digital switch 20 provides network interface signals having the second signaling protocol format to cross-connect 18 over any of telecommunication links 22a–22n. Cross-connect 18 appropriate connects the network interface signals destined for second subscriber 24 through signaling protocol converter 30. Signaling protocol converter 30 converts the network interface signals with the second signaling protocol format to network interface signals having the first signaling protocol format for transfer to D4 channel bank 26 over telecommunications link 28. D4 channel bank 26 processes the network interface signals with the first signaling protocol format in order to provide telecommunications traffic to second subscriber 24.

For the example shown, second subscriber 24 is a foreign exchange subscriber operating in a loop start mode. From the point of view of D4 channel bank 26, local digital switch 20 appears to support the foreign exchange subscriber loop start implementation. From the point of view of local digital switch 20, D4 channel bank 26 appears to be a conventional SLC-96 remote terminal having a single party line in mode 1. This is achieved through the conversion performed by signal line protocol converter 30.

Figure 2:
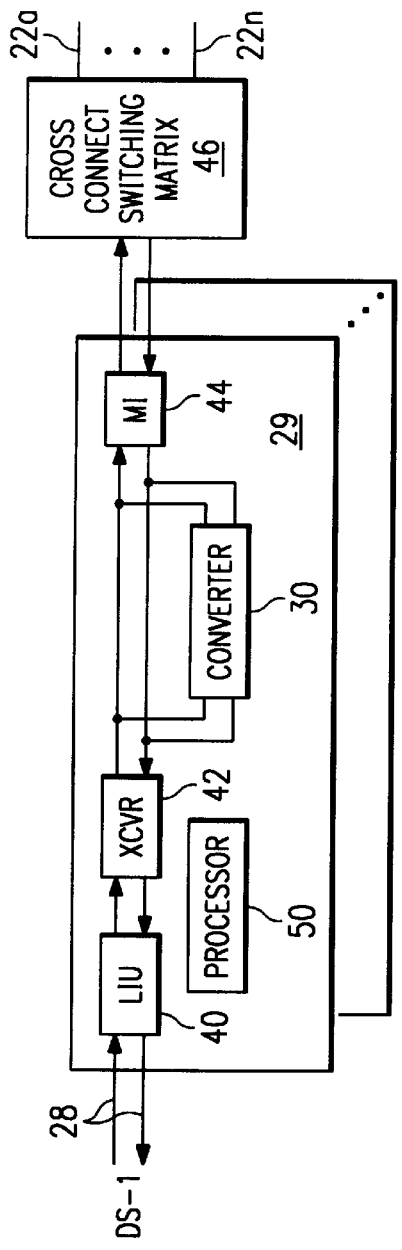
FIG. 2 illustrates a block diagram of a cross-connect within the telecommunication system.

FIG. 2 is a block diagram of cross-connect 18. In the upstream direction, cross-connect 18 receives network interface signals, such as a DS-1 signal, at a line interface unit 40. Line interface unit 40 performs the physical interface between telecommunications link 28 and cross-connect 18. Line interface unit 40 provides the DS-1 signal, typically containing 24 channels of DS-0 signals, to a transceiver 42. Each DS-0 signal channel has a first signaling protocol format such as the industry standard D4 signaling protocol. Transceiver 42 provides each DS-0 signal channel to signaling protocol conver 30. Signaling protocol converter 30 converts D4 signaling protocol format into a second signaling protocol format, such as the industry standard TR-08 signaling protocol. Signaling protocol converter 30 passes the DS-0 signal channels and the TR-08 signaling protocol format to a matrix interface 44. Matrix interface 44 prepares the DS-0 signal channels for cross-connection as performed by a cross-connect switching matrix 46. Cross-connect switching matrix 46 provides each DS-0 signal channels to local digital switch 20 over the appropriate telecommunication link 22a–22n.

For downstream flow, telecommunications traffic is received at cross-connect switching matrix 46 from telecommunications links 22a–22n. The telecommunications traffic is received as DS-1 signals with 24 DS-0 signal channels each having the TR-08 signaling protocol. DS-0 signal channels destined for second subscriber 24 are cross-connected through by cross-connect switching matrix 46 to matrix interface 44. Matrix interface 44 provides the appropriate DS-0 signal channels to signaling protocol converts 30. Signaling protocol converter 30 converts DS-0 signal channels having the TR-08 signaling protocol to DS-0 signal channels having the D4 signaling protocol. The DS-0 signal channels, now with the D4 signaling protocol, are passed by signaling protocol converter 30 to transceiver 42. Transceiver 42 prepares the DS-0 signal channels for transmission by line interface unit 40 over telecommunication link 28 as the DS-1 network interface signals.

Line interface unit 40, transceiver 42, signaling protocol converter 30, and matrix interface 44 are preferably placed onto line card 28 under supervision of a processor 50. Processor 50 may be programmed to provide selective conversion of DS-0 signal channels, wherein some DS-0 signal channels may be converted from the first to the second signaling protocol and some DS-0 signal channels may not be converted. In this manner, line cards 29 with signaling protocol converter 30 may be provisioned on each port of cross-connect 18, to include a port at telecommunication link 16, even though protocol conversion may not be necessary. Preferably, there are a plurality of line cards 29 connected to switching matrix 46 in cross-connect 18 to handle a desired amount of telecommunication traffic processing.

Figure 3:
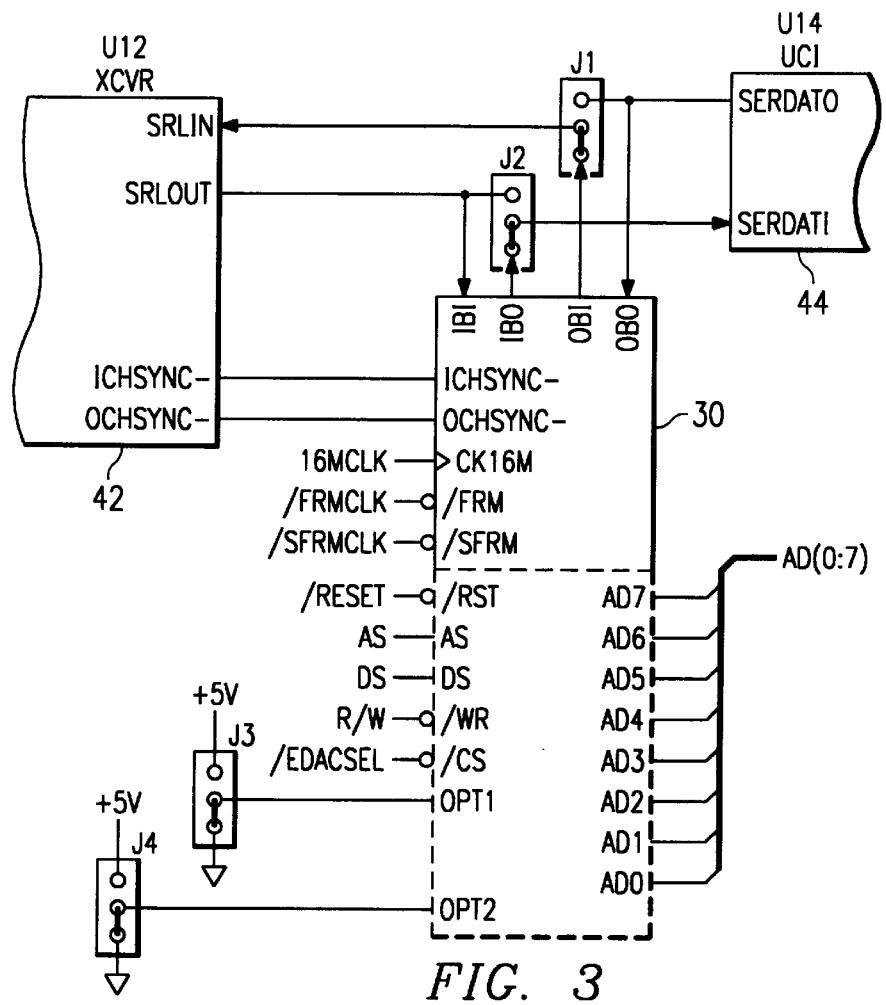
FIG. 3 illustrates a block diagram of a signaling protocol converter within the cross-connect.

FIG. 3 is a block diagram of signaling protocol converts 30. Signaling protocol converter 30 intercepts serial data streams to and from both transceiver 42 and matrix interface 44 through respective jumpers J1 and J2. The serial data stream generated by transceiver 42 in the upstream direction and received by transceiver 42 in the downstream direction includes pulse code modulation (PCM) data, signaling, frame, trunk conditioning indicator, and parity information transported over a 21-bit serial stream. Jumpers J1 and J2 may also provide the ability to bypass signaling protocol converter 30 such that the serial data streams flow directly from transceiver 42 to matrix interface 44 and/or from matrix interface 44 to transceiver 42. Timing for signaling protocol converter 30 is provided by a system reference clock signal 16MCLK, a system frame synchronization signal/FRMCLK, and a system super frame synchronization signal/SFRMCLK. Transceiver 42 and matrix interface unit 14 may be programmed to offset the serial data streams with respect to the system timing. To accommodate these offsets, an inbound synchronization signal ICHSYNC—and an outbound synchronization signal OCHSYNC—are provided to signaling protocol converter 30 from transceiver 42 to indicate the beginning of inbound and outbound channel times, respectively. Signaling protocol converter 30 may be implemented as an application specific integrated circuit chip.

Figure 4:
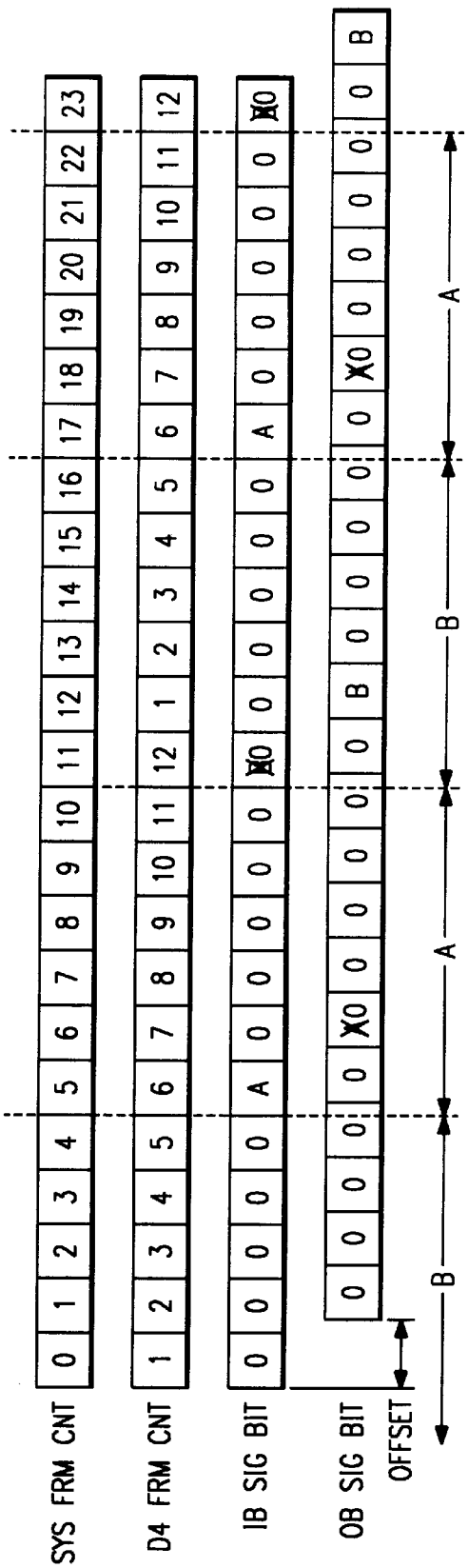
FIG. 4 illustrates a conversion relationship for the signaling protocol converter.

FIG. 4 shows a relationship between system super frame count, D4 frame count, and inbound and outbound signaling. The system super frame consists of 24 frames. D4 framing has 12 frames with the signaling protocol sent in frames 6 and 12. Frame 6 has the "A" signaling bits and frame 12 has the "B" signaling bits. Transceiver 42 repeats the D4 framing twice during a single system super frame. For signaling protocol conversion in the inbound direction from transceiver 42 through signaling protocol converter 30 to matrix interface unit 44, all signaling bits in system frames 11–16 and frame 23 with frames 0–4 are zeroed out. This will zero out the "B" signaling bits in frame 12 of each D4 frame in order to provide signaling protocol conversion from the D4 format to the TR-08 format. For signaling protocol conversion in the outbound direction from matrix interface 44 through signaling protocol converter 30 to transceiver 42, all signaling bits in system frames 5–10 and 17–22 are zeroed out. This will zero out the "A" signaling bits in frame 6 of each D4 frame in order to provide signaling protocol conversion from the TR-08 format to the D4 format. This signaling protocol conversion is performed independent of any offset introduced by either transceiver 42 or matrix interface unit 44. To complete the appropriate conversion, the parity bit should be inverted in each channel where a signaling bit was forced from a one to a zero. Table I shows the conversion of the "A" and "B" signaling bits for the exemplary conversion between D4 and TR-08 formats.

TABLE I

| CONVERSION FXS to LDS DIRECTION (INBOUND) | | | | | |
|---|---|---|---|---|---|
| Customer State | Bits Sent from D4 | | Bits Sent from TR08 | | Channel State |
|  | A | B | A | B |  |
| On-Hook | 0 | 1 | 0 | 0 | On-Hook |
| Off-Hook | 1 | 1 | 1 | 0 | Off-Hook |
| Unknown | 0 | 0 | 0 | 0 | On-Hook |
| Unknown | 1 | 0 | 1 | 0 | Off-Hook |

| CONVERSION LDS to FXS DIRECTION (OUTBOUND) | | | | | |
|---|---|---|---|---|---|
| Customer State | Bits Sent to D4 | | Bits Sent from TR08 | | Channel State |
|  | A | B | A | B |  |
| No Ringing | * | 1 | 0 | 0 | Undefined |
| No Ringing | * | 1 | 0 | 1 | Channel Test |
| No Ringing | * | 1 | 1 | 1 | Idle |
| Ringing | * | 0 | 1 | 1/0 | -R Ringing |
| No Ringing | * | 1 | 1 | 0 | Forward Disconnect |

Notes: * indicates don't care (either 1 or 0)
1/0 indicates alternation 1 then 0 on superframe basis
Shaded cells indicate input bits Though the signaling protocol conversion system has been shown to interface and cross-connect both D4 and DS-1 signals and signaling bits and TR-08 format DS-1 signals and signaling bits at the DS-0 signal level, other types of signaling protocol conversions may be implemented by signaling protocol converts 30. For example, network interface signals other than DS-1 signals may be processed by cross-connect 18. These network interface signals may include DS-3, OC-n, STS-1, STM-n as well as other standard domestic and international signal transports. The signaling protocol conversion may be performed with signaling protocol formats other than the D4 and TR-08 formats discussed above. For example, other signaling protocol formats may include TR-303, or other standard domestic and international signaling protocol formats. Signaling bits "A" and "B" may be programmed on a per channel basis in a variable manner other than zeroing out certain frames in the system frame as in inserting ones and/or zeros into appropriate frames for desired conversions. Signaling protocol converter 30 may also be provisioned and/or programmed to perform other multiple types of signaling protocol conversion in both inbound and outbound directions. Also, loop start, ground start, wink start, or any other operating modes may be implemented through signaling protocol converts 30.

Thus, it is apparent that there has been provided in accordance with the present invention, a signaling protocol conversion system that satisfies the advantages set forth above. Although the present invention has been described in detail, it should be understood that various changes, substitutions, and alterations readily ascertainable by those skilled in the art may be made herein without departing from the spirit and scope of the present invention as defined by the following claims.

What is claimed is:

1. A signaling protocol conversion system, comprising:
 a transceiver unit operable to receive an inbound network interface signal having a first signaling protocol;
 a protocol converter operable to convert from the first signaling protocol to a second signaling protocol, wherein the protocol converter is operable to reset a B signaling bit in the first signaling protocol to a zero level state in the second signaling protocol, wherein a parity bit from the first signaling protocol is inverted for the second signaling protocol in response to the B signaling bit being reset from a one level state to a zero level state.

2. A signaling protocol conversion system, comprising:
 a transceiver unit operable to receive an inbound network interface signal having a first signaling protocol;
 a protocol converter operable to convert from the first signaling protocol to a second signaling protocol;
 a matrix interface operable to receive the inbound network interface signal having the second signaling protocol from the protocol converter for transport to a cross-connect matrix, wherein the matrix interface is operable to receive an outbound network interface signal having the second signaling protocol from the cross-connect matrix, wherein the protocol converter is operable to receive the outbound network interface signal having the second signaling protocol from the matrix interface, the protocol converter operable to convert from the second signaling protocol to the first signaling protocol, wherein the protocol converter is operable to reset an A signaling bit in the second signaling protocol to a zero level state in the first signaling protocol, wherein a parity bit from the first signaling protocol is inverted for the second signaling protocol in response to the A signaling bit being reset from a one level state to a zero level state.

3. A signaling protocol conversion system, comprising:
 a transceiver unit operable to receive an inbound network interface signal having a first signaling protocol;
 a protocol converter operable to convert from the first signaling protocol to a second signaling protocol;
 a matrix interface operable to receive the inbound network interface signal having the second signaling protocol from the protocol converter for transport to a cross-connect matrix, wherein the transceiver and the matrix interface are operable to offset the inbound network interface signal with respect to a system timing of the protocol conversion system, the protocol converter being operable to perform conversion from the first signaling protocol to the second signaling protocol independently of offset introduced by the transceiver and the matrix interface.

4. A signaling protocol conversion system comprising:
 a transceiver unit operable to receive an inbound network interface signal having a first signaling protocol;
 a protocol converter operable to convert from the first signaling protocol to a second signaling protocol, the first signaling protocol being different from the second signaling protocol;
 a matrix interface operable to receive the inbound network interface signal having the second signaling protocol from the protocol converter for transport to a cross-connect matrix;
 a jumper coupled to the transceiver, the matrix interface, and the protocol converter, the jumper being operable to allow the inbound network interface signal to transfer from the transceiver to the matrix interface and bypass the protocol converter.

5. A method of performing protocol conversion in a telecommunications network, comprising:

receiving an inbound network interface signal having a first signaling protocol from a subscriber;

converting from the first signaling protocol to a second signaling protocol;

transporting the inbound network interface signal to a telecommunications switch;

resetting a B signaling bit in the first signaling protocol to a zero level state in the second signaling protocol;

inverting a parity bit from the first signaling protocol for use in the second signaling protocol in response to resetting the B signaling bit to the zero level state.

* * * * *